US010939156B1

(12) United States Patent
Subramanian et al.

(10) Patent No.: US 10,939,156 B1
(45) Date of Patent: Mar. 2, 2021

(54) DIGITAL VIDEO RECORDING ("DVR") MEDIA CONTENT TRANSFER SYSTEMS AND METHODS

(71) Applicant: Verizon Patent and Licensing Inc., Arlington, VA (US)

(72) Inventors: Ananthanarayanan Subramanian, Lewisville, TX (US); Srinivasulu Ganipineni, Frisco, TX (US); Ganesan Rengaraju, Irving, TX (US); Vijay Srusti, Irving, TX (US); Carlos Javier Borlando, Lansdale, PA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/812,916

(22) Filed: Mar. 9, 2020

(51) Int. Cl.
*H04N 21/00* (2011.01)
*H04N 21/40* (2011.01)
*H04N 21/41* (2011.01)
*H04N 21/4147* (2011.01)
*H04N 21/426* (2011.01)

(52) U.S. Cl.
CPC ..... *H04N 21/4147* (2013.01); *H04N 21/4126* (2013.01); *H04N 21/42684* (2013.01)

(58) Field of Classification Search
USPC ....... 386/291, 292, 294, 295, 296, 297, 299, 386/278, 239, 248
See application file for complete search history.

(56) References Cited

U.S. PATENT DOCUMENTS

| 9,602,862 B2* | 3/2017 | Williams | ........... H04N 21/4821 |
| 2006/0127037 A1* | 6/2006 | Van Hoff | ............... H04N 5/765 386/233 |

* cited by examiner

*Primary Examiner* — Daquan Zhao (57) ABSTRACT

A target DVR device is configured to receive a transfer request for a source DVR device to transfer media content stored on the source DVR device. The target DVR device transmits an initiation request to a media content transfer management system, the initiation request indicating a request to authorize the transfer of the media content from the source DVR device. The media content transfer management system is configured to transmit a command to the source DVR device, the command configured to put the source DVR device in a media content transfer mode. The target DVR device further receives, from the source DVR device over a local connection, a discovery message, and establishes, based on the discovery message, a communication session with the source DVR device over the local connection, and receives, by way of the communication session, the media content from the source DVR device.

20 Claims, 7 Drawing Sheets

DIGITAL VIDEO RECORDING ("DVR") MEDIA CONTENT TRANSFER SYSTEMS AND METHODS

BACKGROUND INFORMATION

Digital video recording ("DVR") devices allow users to record media content assets (e.g., television programs, etc.) and then view or otherwise experience the recorded media content assets. For example, a user may use a DVR device to schedule a recording of a particular television program, after which the DVR device may record the television program and allow the user to play back the recorded television program in a time-shifted manner.

Over time, a DVR device may record and store (e.g., within a hard drive) an extensive library of media content assets. The DVR device may also store DVR data associated with the library of media content assets and/or the DVR device. The DVR data may include metadata descriptive of the media content assets, data representative of settings (e.g., recording instructions provided by the user, recording conflict resolution rules, etc.) of the DVR device, and/or data representative of business logic used by the DVR device to implement the various recording instructions provided by the user and/or any other operation performed by the DVR device.

Unfortunately, if the user desires to upgrade or otherwise switch to a new DVR device, the user typically has to program the new DVR device from scratch. For example, the user may have to provide a whole new set of recording instructions to the new DVR device and interact extensively with the new DVR device for the new DVR device to "learn" (i.e., develop the appropriate business logic) the tendencies and/or preferences of the user. This process can be tedious, time consuming, and daunting for the user, especially if the new DVR device has a different interface and/or different specifications than the previous DVR device.

Moreover, it may be difficult or even impossible for the user to rebuild the library of media content assets that he or she had recorded on the previous DVR device. For example, the user may have to manually identify each media content asset that had been recorded and then manually determine how to acquire each media content asset (e.g., by searching within an electronic program guide for a rebroadcast of a particular media content asset and then directing the new DVR device to record the media content asset when it is rebroadcast). In addition to being tedious and time consuming for the user, this process may be futile for some media content assets if they are not scheduled to for rebroadcast.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

DVR media content transfer methods and systems are described herein. For example, media content may be transferred from a source DVR device to a target DVR device via a local connection. Such transfers may involve a remote media content transfer management system that may provide information, authentication, and/or authorization for the media content transfer.

For instance, the target DVR device may receive a transfer request to transfer media content from the source DVR device to the target DVR device for storage on the target DVR device. The target DVR device may transmit, in response to the transfer request and over the remote network, an initiation request to the remote media content transfer management system, the initiation request indicating a request to authorize the transfer of the media content from the source DVR device to the target DVR device. The remote media content transfer management system may verify, in response to the initiation request, that the source and the target DVR devices are both on the local network and associated with a same user account. The remote media content device may further transmit, over the remote network and based on the verifying, a command to the source DVR device, the command configured to put the source DVR device in a media content transfer mode. The source DVR device may transmit, to the target DVR device over the local network while in the media content transfer mode, a discovery message. The target DVR device may further establish, based on the discovery message, a communication session with the source DVR device over the local connection, and receive, by way of the connection, the media content from the source DVR device.

Various benefits may be realized in accordance with the methods and systems described herein. For example, the methods and systems described herein may allow a user to transfer media content from a first DVR device to a second DVR device without having to manually rebuild the library of media content assets on the second DVR device over time. The DVR media content transfer may make transitions between DVR devices (and/or systems) convenient, such as allowing users to upgrade DVR devices. These and/or other benefits or advantages of the exemplary systems and methods will be made apparent herein. Exemplary DVR media content transfer methods and systems will now be described with reference to the drawings.

Figure 1:
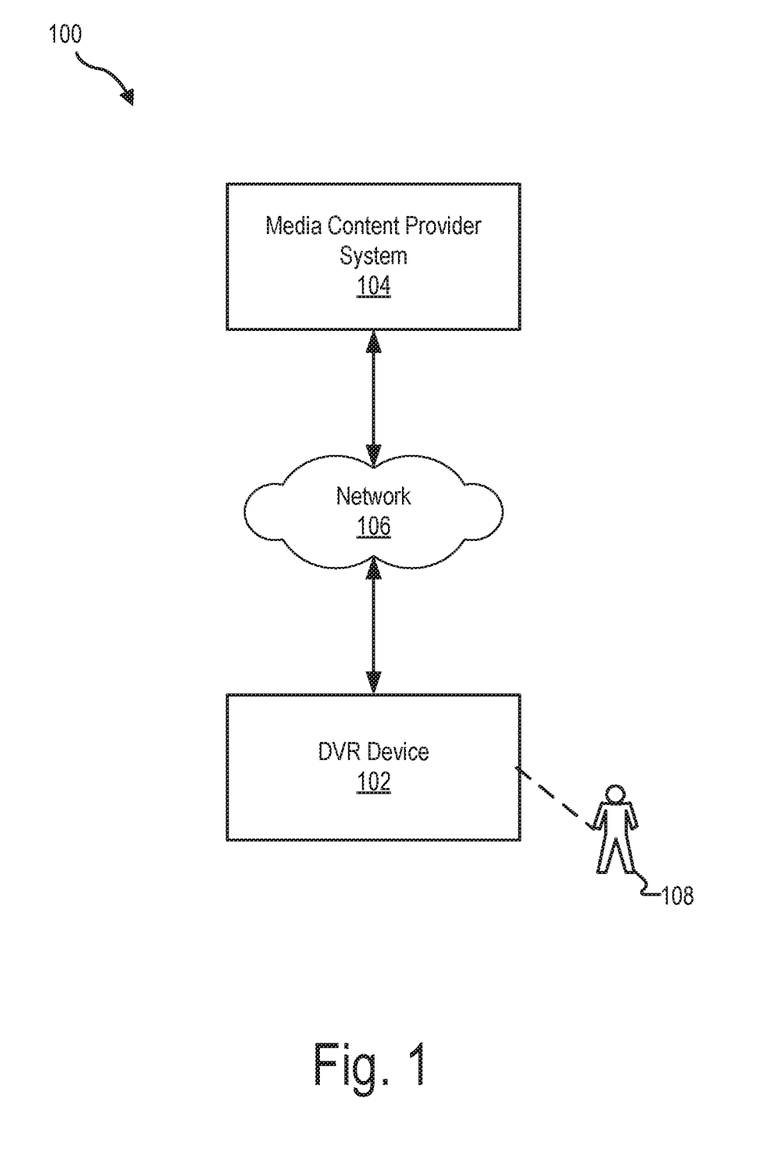
FIG. 1 illustrates an exemplary configuration in which a DVR device is communicatively coupled to a media content provider system according to principles described herein.

FIG. 1 illustrates an exemplary configuration 100 in which a DVR device 102 is communicatively coupled to a media content provider system 104. DVR device 102 and media content provider system 104 may communicate with one another using any suitable communication technologies, devices, media, and protocols supportive of data communications, including, but not limited to, socket connections, Ethernet, data bus technologies, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Mark-up Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Evolution Data Optimized Protocol ("EVDO"), Time Division Multiple Access ("TDMA") technologies, Short Message Service ("SMS"), Multimedia Message Service ("MMS"), radio frequency ("RF") signaling technologies, wireless communication technologies (e.g., Bluetooth, Wi-Fi, etc.), in-band and out-of-band signaling technologies, and other suitable communications technologies.

DVR device 102 and media content provider system 104 may communicate using any suitable network. For example, as shown in FIG. 1, DVR device 102 and media content provider system 104 may be configured to communicate with each other by way of network 106. Network 106 may include one or more networks or types of networks capable of carrying communications and/or data signals between DVR device 102 and media content provider system 104. For example, network 106 may include, but is not limited to, a cable network, an optical fiber network, a hybrid fiber coax network, a wireless network (e.g., a Wi-Fi and/or mobile telephone network), a satellite network, a wireless broadcast network (e.g., a satellite media broadcasting network or terrestrial broadcasting network), a subscriber television network, a provider-specific network, the Internet, an intranet, a local area network, any other suitable network, and/or any combination or sub-combination of these networks.

Media content provider system 104 may be associated with one or more providers of one or more services, such as a provider of a DVR service (e.g., a subscription DVR service), a television service (e.g., a subscription television service), an electronic media program guide service (e.g., a media program guide data distribution service), an Internet service, a video-on-demand service, a media content distribution service, a media content source service, and/or any other type of media content service. Accordingly, media content provider system 104 may be configured to provide media content for access by DVR device 102. For example, media content provider system 104 may be configured to manage (e.g., maintain, process, distribute, and/or generate) media content assets and/or electronic program guide data configured to be delivered to DVR device 102. Media content provider system 104 may be implemented by one or more computing devices (e.g., one or more servers associated with one or more entities) as may serve a particular implementation.

DVR device 102 may facilitate access by one or more users to one or more services and/or media content (e.g., media content assets) provided by media content provider system 104. For example, DVR device 102 may present and/or record media content assets at the direction of one or more users. To this end, DVR device 102 may be a device of a DVR system. The DVR system (and/or DVR device 102) may include one or more tuners. Each tuner may be configured to be tuned to a particular media content asset at the direction of DVR device 102 (and/or the DVR system) and/or at the direction of a user of DVR device 102. This may be performed in any suitable manner. For example, a tuner may tune to a media content asset by tuning to a media content channel carrying the media content asset. Additionally or alternatively, a tuner may tune (e.g., switch) to a digital stream of data packets (e.g., Internet Protocol ("IP") based data packets) carrying the media content asset. A "tuner" may be implemented by one or more hardware components and/or one or more software components.

In some examples, DVR device 102 may be associated with a user account maintained by and/or otherwise corresponding to one or more users (e.g., user 108 shown in FIG. 1). For example, the user may associate his or her user account with DVR device 102 by subscribing to a DVR service provided by media content provider system 104 for access by way of DVR device 102, registering the user account with DVR device 102 (e.g., by logging in to DVR device 102), and/or in any other manner.

A user account associated with DVR device 102 may be associated with media content stored by DVR device 102, such as a library of media content assets that have been recorded over time by DVR device 102.

The user account associated with DVR device 102 may also be associated with a DVR data set maintained or accessed by DVR device 102. As used herein, the terms "DVR data" and "DVR data set" may refer to any data associated with (e.g., maintained and/or used by) a DVR system and/or a DVR device. In some examples, the DVR data may be separate from data representative of the actual media content included in a library of media content assets stored by the DVR device (i.e., the DVR data may be separate from one or more data files representative of each media content asset included in the library of media content assets). For example, a DVR data set associated with DVR device 102 that a user has used over a period of time to acquire (e.g., record) a library of media content assets may include metadata descriptive of one or more characteristics of the media content assets (e.g., electronic program guide data obtained from an electronic program guide data provider), data representative of settings of the DVR system (e.g., recording instructions provided by the user to acquire the media content assets, recording conflict resolution rules, etc.), and/or data representative of logic used by the DVR system to implement the various recording instructions provided by the user and/or any other operation performed by the DVR system.

As used herein, media content may include media content assets. A "media content asset" may refer to any media content program, television program, on-demand media program, pay-per-view media program, broadcast media program (e.g., broadcast television program), multicast media program (e.g., multicast television program), narrowcast media program (e.g., narrowcast video-on-demand program), IPTV media content, advertisement, video, movie, audio program, radio program, or any segment, component, or combination of these or other forms of media content that a user may access by way of a DVR system.

In some examples, DVR device 102 may be provided and/or otherwise managed by a service provider associated with media content provider system 104. For example, DVR device 102 may be provided (e.g., leased to a user) by a particular DVR service provider and/or subscriber television service provider.

DVR device 102 may be implemented by any suitable media content processing or computing devices ("processing devices"). For example, DVR device 102 may be implemented by one or more local processing devices each associated with the same user account (i.e., processing devices that the user interacts with directly such as set-top box devices, receivers, personal computers, mobile devices (e.g., mobile phones and/or tablet computers), personal-digital assistant devices, gaming devices, television devices, etc.). Each processing device may include a storage device configured to store data associated with the processing device and one or more processors configured to perform the operations described herein.

Figure 2:
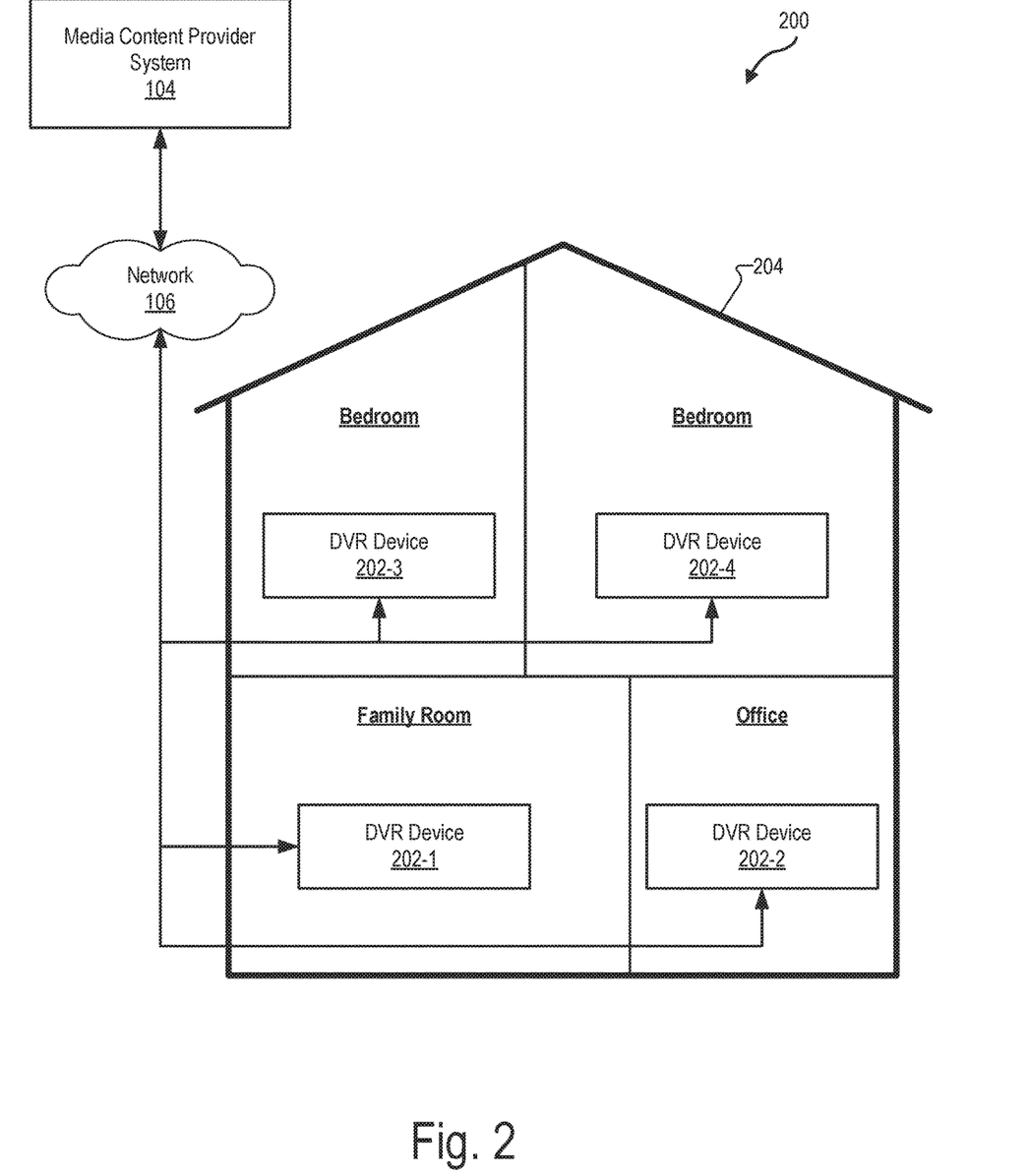
FIG. 2 shows an exemplary implementation of a DVR system according to principles described herein.

To illustrate, FIG. 2 shows an exemplary implementation 200 of a DVR system implemented by a plurality of DVR devices 202 (e.g., DVR devices 202-1 through 202-4) located within a particular premises 204 (e.g., a home). Each DVR device 202 may be an implementation of DVR device 102. For example, each DVR device 202 may be implemented by a set-top box device having DVR capabilities.

As shown, DVR devices 202 may be distributed throughout premises 204. For example, FIG. 2 shows that DVR devices 202 are distributed throughout various rooms of premises 204. In this manner, users located within premises 204 may experience and/or otherwise interact with media content at various locations throughout premises 204.

DVR devices 202 may each be associated with (e.g., connected to) a display 206 (e.g., displays 206-1 through 206-4). Displays 206 may include any suitable display device separate from DVR devices 202 (e.g., televisions, computer monitors, etc.) and/or any suitable display device integrated into DVR devices 202 (e.g., display screens). DVR devices 202 may be configured to present media content by way of displays 206.

As shown, each DVR device 202 may be communicatively coupled to media content provider system 104 by way of network 106. This may be realized in any suitable manner, such as directly or by way of one or more intermediary devices such as a gateway device at premises 204.

Figure 3:
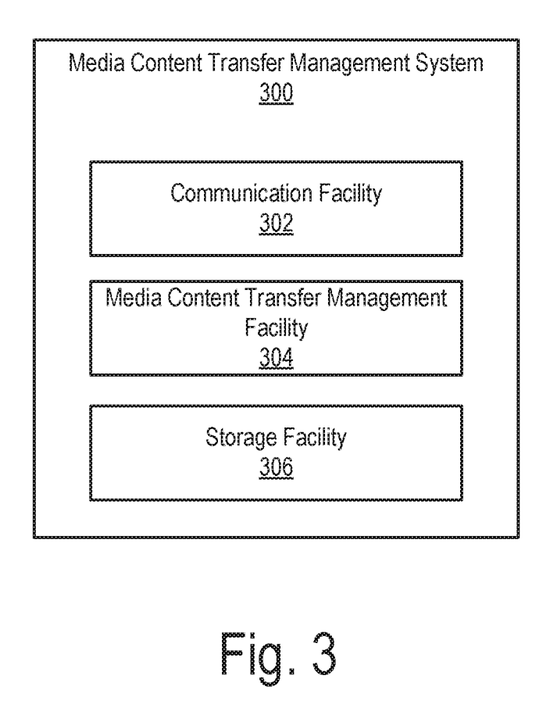
FIG. 3 illustrates an exemplary media content transfer management system according to principles described herein.

FIG. 3 illustrates an exemplary media content transfer management system 300 ("system 300") configured to facilitate media content transfer from a first DVR device to a second DVR device. As shown, system 300 may include, without limitation, a communication facility 302, a media content transfer management facility 304, and a storage facility 306 selectively and communicatively coupled to one another. It will be recognized that although facilities 302-306 are shown to be separate facilities in FIG. 3, any of facilities 302-306 may be combined into fewer facilities, such as into a single facility, or divided into more facilities as may serve a particular implementation.

System 300 may be implemented by any suitable combination of computing devices and/or systems. For example, facilities 302-306 of system 300 may be implemented by media content provider system 104, by a server not associated with media content provider system 104, and/or by any other device and/or system. Alternatively, facilities 302-306 of system 300 may be distributed across any combination of these systems and/or devices.

Communication facility 302 may be configured to receive and transmit data associated with a transfer of media content from a first DVR device to a second DVR device. This may be performed in any suitable manner. Examples are further described herein.

Media content transfer management facility 304 may be configured to perform one or more media content transfer management operations. For example, in response to a request for a transfer of media content from a first DVR device to a second DVR device, media content transfer management facility 304 may facilitate the transfer of media content by providing authentication, authorization, information, etc. Examples are further described herein.

Storage facility 306 may maintain (e.g., store) executable and/or operational data used by communication facility 302 and/or media content transfer management facility 304 to perform any of the functionality described herein. For example, storage facility 306 may store instructions that may be executed by communication facility 302 and/or media content transfer management facility 304 to perform one or more of the operations described herein. Instructions may be implemented by any suitable application, software, code, and/or other executable data instance. Storage facility 306 may also maintain any data received, generated, managed, used, and/or transmitted by communication facility 302 and/or media content transfer management facility 304.

Figure 4:
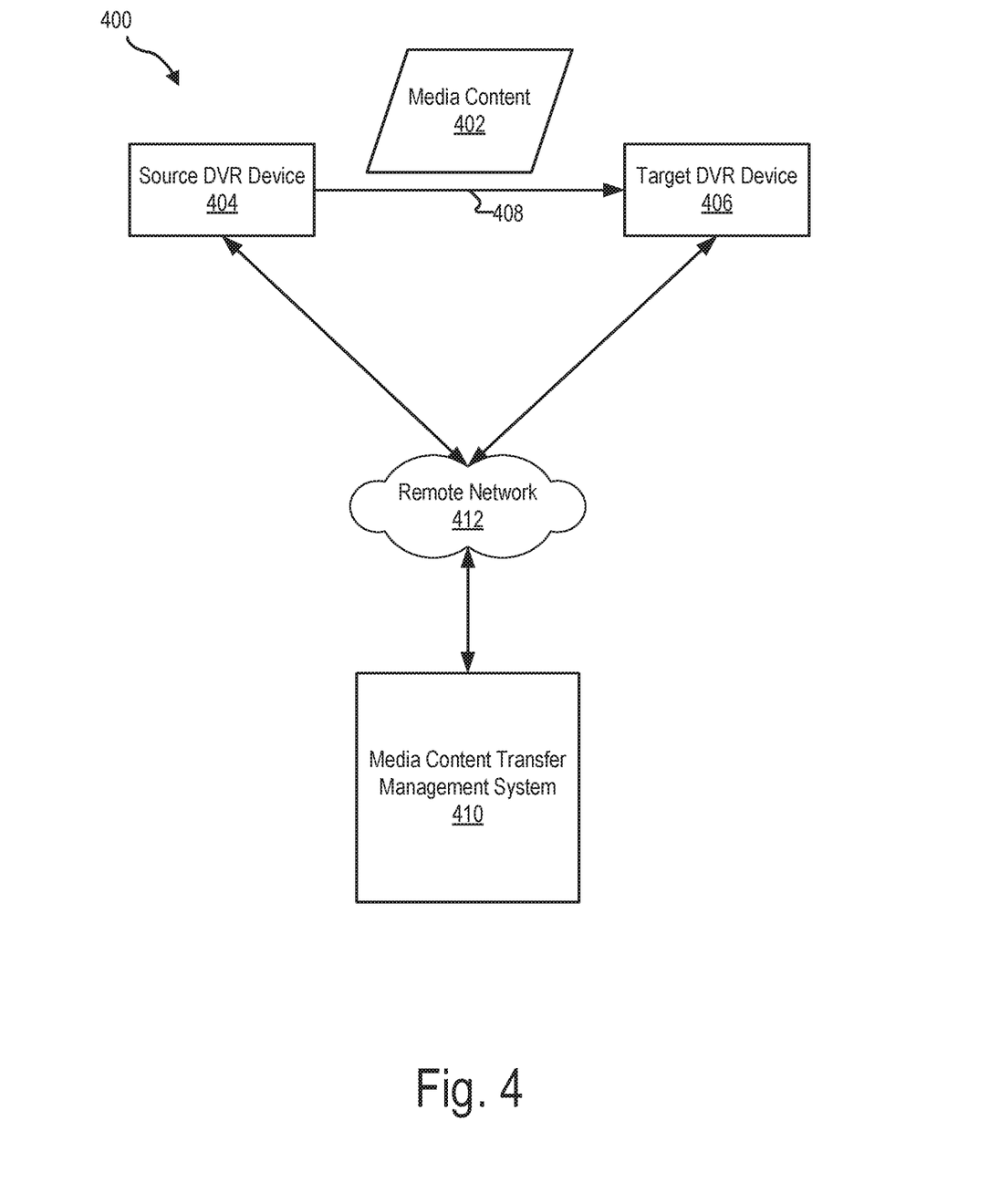
FIG. 4 illustrates an exemplary implementation in which media content is transferred according to principles described herein.

FIG. 4 illustrates an exemplary implementation 400 in which media content 402 is transferred from a source DVR device 404 to a target DVR device 406. Source DVR device 404 and target DVR device 406 may be example implementations of DVR device 102 and communicatively coupled to each other via a local connection 408. Source DVR device 404 and target DVR device 406 may also be communicatively coupled to a media content transfer management system 410 (e.g., an implementation of media content transfer management system 300, which may be remote from source DVR device 404 and/or target DVR device 406) via a remote network 412 (e.g., an implementation of network 106 that communicatively couples devices within a local area to devices outside (remote from) the local area).

As shown, source DVR device 404 may be connected to target DVR device 406 via local connection 408. Local connection 408 may be implemented in any suitable manner, such as a direct wired connection between source DVR device 404 and target DVR device 406 (e.g., via a cable such as a coaxial cable, an Ethernet cable, etc.), a wired connection via a router, a splitter, or other such device and/or connector, a wireless connection (e.g., Bluetooth, etc.), a local area network (LAN), a Multimedia over Coax Alliance (MoCA) connection, or any other suitable connection that connects devices within a local area (e.g., an implementation of premises 204).

In this example, target DVR device 406 may receive a transfer request (e.g., from a user, an administrator, a technician, another device, etc.) to transfer media content 402 from source DVR device 404 to target DVR device 406. Such a transfer request may be received, for instance, as the user upgrades and/or replaces a DVR system and/or a DVR device.

In response to receiving the transfer request, target DVR device 406 may transmit over remote network 412 to media content transfer management system 410 an initiation request to initiate the transfer of media content 402. For example, the initiation request may indicate a request to authorize and/or verify an authorization of the transfer of media content 402 from source DVR device 404 to target DVR device 406.

In response to the initiation request, media content transfer management system 410 may verify whether the transfer is authorized. Such authorization may be based on any suitable parameters, conditions, and/or permissions. For instance, media content transfer management system 410 may verify whether source DVR device 404 and target DVR device 406 are associated with a same user account, whether source DVR device 404 and target DVR device 406 are located in a same local area, on a same local network (e.g., connected to the same gateway router) and/or associated with a same location, etc.

In some examples, media content transfer management system 410 may also transmit device information associated with source DVR device 404 to target DVR device 406 over remote network 412. Device information associated with source DVR device 404 may include any suitable information associated with source DVR device 404, such as a name of source DVR device 404, a unit address of source DVR device 404, a serial number of source DVR device 404, user account information (e.g., a user account number, name, etc.) associated with source DVR device 404, etc. The device information may be transmitted to target DVR device 406 based on a valid verification of the initiation request. Additionally or alternatively, the device information may be transmitted to target DVR device 406 in response to the initiation request. In such examples, media content transfer management system 410 may send device information for some or all of potential source DVR devices associated with the user account. Target DVR device 406 may include particular device information to specify which DVR device that target DVR device 406 is requesting transfer of media content 402 from. In some examples, target DVR device 406 may present a list of potential source DVR devices to the user to select a source DVR device for transfer of media content.

In response to the verification, media content transfer management system 410 may transmit a command to source DVR device 404 over remote network 412. The command may be configured to put source DVR device 404 in a media content transfer mode. In response to the command to put source DVR device 404 in the media content transfer mode, source DVR device 404 may enable the media content transfer mode and transmit a discovery message over local connection 408. The discovery message may include device information associated with source DVR device 404, such as some or all of the device information (e.g., the unit address of source DVR device 404, the serial number of source DVR device 404, etc.) transmitted by media content transfer management system 410 to target DVR device 406. Additionally, the discovery message may be a proprietary message that is configured to be parsed by target DVR device 406 and not parsable by other devices (e.g., other devices on local connection 408, such as a LAN).

Target DVR device 406 may receive and parse the discovery message to detect source DVR device 404 and/or establish a communication session with source DVR device 404 over local connection 408. Additionally, in some examples, target DVR device 406 may compare the device information received in the discovery message with the device information received from media content transfer management system 410. Target DVR device 406 may further verify authorization of the transfer of media content 402 by determining whether the device information received in the discovery message matches the device information received from media content transfer management system 410.

Once the communication session is established, target DVR device 406 may receive media content 402 from source DVR device 404 via the communication session. Additionally or alternatively, target DVR device 406 may receive metadata for media content assets stored on source DVR device 404. Based on the metadata, target DVR device 406 may present to the user on a display (e.g., via a user interface screen) options for the user to select specific media content assets to be transferred from source DVR device 404. Options may include all media content assets on source DVR device 404, specific shows, episodes, or any other suitable subset of media content assets on source DVR device 404. Based on the user selection, media content 402 may include a selected subset or all of media content assets on source DVR device 404. The transferred media content 402 may include metadata associated with the media content 402 (e.g., show name, record time(s) and durations, DRM information, guide identifiers, etc.).

Media content 402 may be transferred over local connection 408 in any suitable manner. For instance, media content 402 may be transferred in an encrypted format, which may allow media content 402 to be transferred through a non-secure protocol (e.g., Hypertext Transfer Protocol (HTTP) or any other suitable protocol) over local connection 408. Content that is associated with a digital rights management (DRM) system may be handled in any number of ways. In some implementations, one or more keys (e.g., DRM decryption keys) associated with the encrypted format of media content 402 may be transferred from source DVR device 404 to target DVR device 406. Keys may be transferred through a secure protocol (e.g., Hypertext Transfer Protocol Secure (HTTPS) or any other suitable secure protocol). Additionally or alternatively, target DVR device 406 may decrypt the encrypted format of media content 402 using the received keys and re-encrypt media content 402 using local keys. Additionally or alternatively, target DVR device 406 may incorporate the received keys into its own key storage (e.g., adjust parameters, such as an intellectual property rights management (IPRM) license or any other suitable parameters, on target DVR device 406) to enable target DVR device 406 to decrypt and present media content 402 in the encrypted format received by target DVR device 406. Additionally or alternatively, media content 402 may be decrypted on source DVR device 404 prior to transfer and transferred through a secure protocol to target DVR device 406, which may encrypt media content 402 using local keys.

In some examples, media content transfer management system 410 may verify media content 402 to allow for playback of media content 402 on only one of source DVR device 404 or target DVR device 406 at any given time. Such management may be implemented in any suitable manner. For instance, in response to receiving media content 402, target DVR device 406 may provide an acknowledgment that media content 402 has been received. In response, media content transfer management system 410 may transmit an instruction to source DVR device 404 to delete media content 402 on source DVR device 404. Additionally or alternatively, media content 402 may be deactivated or otherwise rendered unplayable on source DVR device 404 (e.g., by deleting keys for decrypting, etc.). By providing one playable version of media content 402 to a same user at any given time, digital rights management (DRM) impacts may be avoided.

Figure 5:
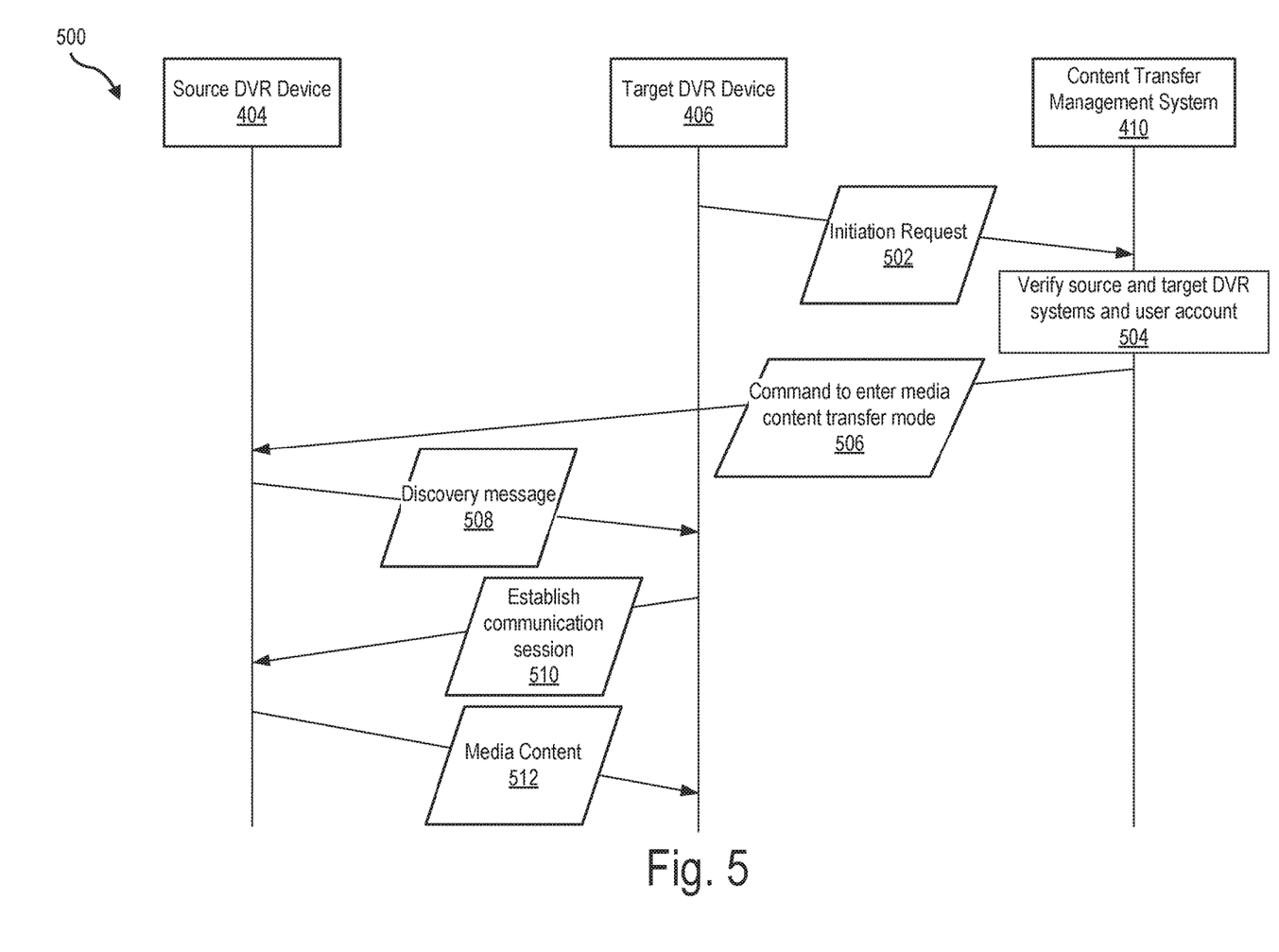
FIG. 5 illustrates an exemplary data flow in which media content is transferred according to principles described herein.

FIG. 5 illustrates an exemplary data flow diagram for transferring media content. While FIG. 5 illustrates exemplary operations and data flows according to one embodiment, other embodiments may omit, add to, reorder, combine, and/or modify any of the operations and/or data shown in FIG. 5. FIG. 5 shows data being transmitted and received by each of source DVR device 404, target DVR device 406, and content transfer management system 410 as described.

In operation 502, target DVR device 406 transmits an initiation request to content transfer management system 410. Operation 502 may be performed in any of the ways described herein.

In operation 504, content transfer management system 410 verifies, in response to the initiation request, that source DVR device 404 and target DVR device 406 are both associated with a same user account. Operation 504 may be performed in any of the ways described herein.

In operation 506, content transfer management system 410 transmits, based on the verifying, a command to source DVR device 404, the command configured to put source DVR device 404 in a media content transfer mode. Operation 506 may be performed in any of the ways described herein.

In operation 508, source DVR device 404 transmits, to target DVR device 406 while in the media content transfer mode, a discovery message. Operation 508 may be performed in any of the ways described herein.

In operation 510, target DVR device 406 establishes, based on the discovery message, a communication session with source DVR device 404. Operation 510 may be performed in any of the ways described herein.

In operation 512, source DVR device 404 transmits and target DVR device 406 receives, through the communication session, the media content. Operation 512 may be performed in any of the ways described herein.

In some implementations, the source DVR device 404 may not be capable of performing a content transfer. For example, source DVR device 404 may be a model of DVR device that does not support content transfer, or may not currently have onboard capabilities installed to support content transfer. Accordingly, in some implementations, the capabilities of the source DVR device 404 may be determined, and updated (if possible) to support a content transfer. For example, target DVR device 406 (or a separate device that may have communication access to media content transfer management system 410) may send an initial message to media content transfer management system 410 indicating that a content transfer from source DVR device 404 is requested. The message may include identifiers of target DVR device 406, source DVR device 404 and/or the user (e.g., a user account identifier, premises identifier, etc.).

Media content transfer management system 410 may, in response to the message, verify that source DVR system 404 is capable of performing a content transfer. Media content transfer management system 410 may use one or more of the identifiers to determine the capabilities of source DVR device 404. For example, the identifiers may be used to look up a model type, firmware type, or other capability information associated with source DVR device 404. In some implementations, media content transfer management system 410 may send a request to source DVR device 404 to obtain its capabilities. If the verification indicates that source DVR device 404 is capable of performing a content transfer, media content transfer management system 410 may respond to the initial message with an indication that source DVR device 404 is capable of transfer. If the verification indicates that source DVR device 404 is not capable of performing a content transfer, a response to the initial message may be sent indicating the inability to perform a transfer. If the verification indicates that source DVR device 404 currently does not have the capability to perform the content transfer, but an update is available that will allow source DVR device 404 to perform the transfer, media content transfer management system 410 may initiate an update process to update source DVR device 404 with the content transfer capabilities. For example, media content transfer management system 410 may cause updated software (e.g. firmware) to be provided to source DVR device 404. Media content transfer management system 410 may provide a response to the initial message that indicates that source DVR device 404 has been updated and is capable of performing a content transfer. The messages/responses noted above may be incorporated into other messages provided to/from media content transfer management system 410 described above, such as the initiation request, the command to source DVR device 404, etc.

Content transfers between DVR devices are expected to be associated with device upgrades. As an additional security protocol, in some implementations an authorization to perform a content transfer may be tied to an upgrade request associated with a user's account. For example, when a DVR device upgrade is requested by a user, an upgrade indicator may be placed in an account associated with the user. The upgrade indicator may include a time period indicator during which a content transfer is authorized. For example, the upgrade indicator may include a date and/or time when a content transfer will be permitted (or no longer permitted). Media content transfer management system 410 may query the account storing the upgrade indicator when a content transfer is requested (for example, as part of verifying whether the content transfer is authorized). In some implementations, media content transfer management system 410 may adjust the upgrade indicator after a content transfer has been completed to prevent further transfers.

Figure 6:
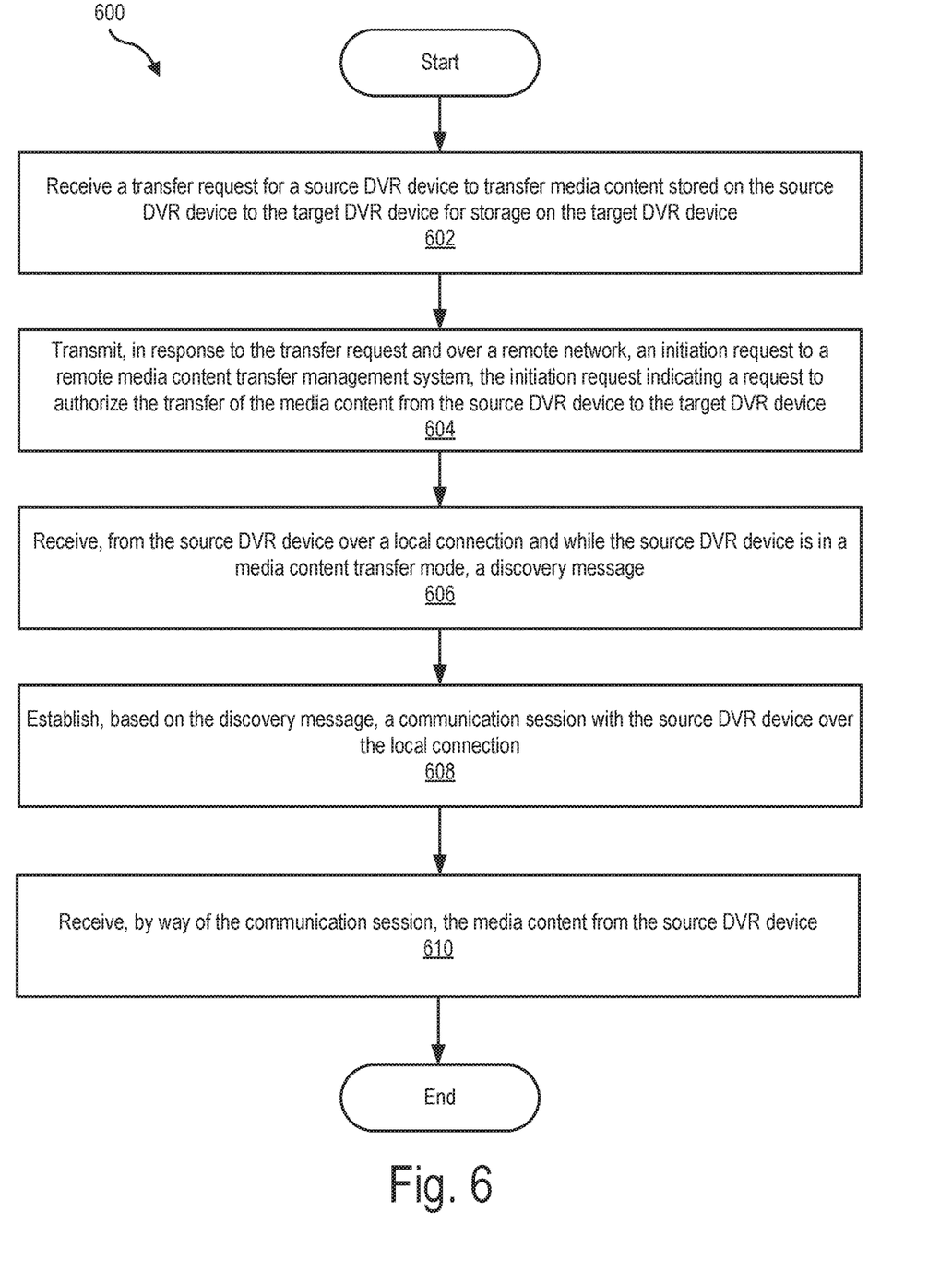
FIG. 6 illustrates an exemplary DVR media content transfer method according to principles described herein.

FIG. 6 illustrates another exemplary DVR media content transfer method 600. While FIG. 6 illustrates exemplary operations according to one embodiment, other embodiments may omit, add to, reorder, combine, and/or modify any of the operations shown in FIG. 6. One or more of the operations shown in FIG. 6 may be performed by a DVR device (e.g., target DVR device 406) and/or any implementation thereof.

In operation 602, a target DVR device receives a transfer request for a source DVR device to transfer media content stored on the source DVR device to the target DVR device for storage on the target DVR device. Operation 1802 may be performed in any of the ways described herein.

In operation 604, the target DVR device transmits, in response to the transfer request and over a remote network, an initiation request to a remote media content transfer management system, the initiation request indicating a request to authorize the transfer of the media content from the source DVR device to the target DVR device. Operation 604 may be performed in any of the ways described herein.

In operation 606, the target DVR device receives, from the source DVR device over a local connection and while the source DVR device is in a media content transfer mode, a discovery message. Operation 606 may be performed in any of the ways described herein.

In operation 608, the target DVR device establishes, based on the discovery message, a communication session with the source DVR device over the local connection. Operation 608 may be performed in any of the ways described herein.

In operation 610, the target DVR device receives, by way of the communication session, the media content from the source DVR device. Operation 610 may be performed in any of the ways described herein.

In certain embodiments, one or more of the systems, components, and/or processes described herein may be implemented and/or performed by one or more appropriately configured computing systems or devices. To this end, one or more of the systems and/or components described above may include or be implemented by any computer hardware and/or computer-implemented instructions (e.g., software) embodied on at least one non-transitory computer-readable medium configured to perform one or more of the processes described herein. In particular, system components may be implemented on one physical computing system or device or may be implemented on more than one physical computing system or device. Accordingly, system components may include any number of computing systems and devices, and may employ any of a number of computer operating systems.

In certain embodiments, one or more of the processes described herein may be implemented at least in part as instructions embodied in a non-transitory computer-readable medium and executable by one or more computing systems. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media, and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a disk, hard disk, magnetic tape, any other magnetic medium, a compact disc read-only memory ("CD-ROM"), a digital video disc ("DVD"), any other optical medium, random access memory ("RAM"), programmable read-only memory ("PROM"), electrically erasable programmable read-only memory ("EPROM"), FLASH-EEPROM, any other memory chip or cartridge, or any other tangible medium from which a computer can read.

Figure 7:
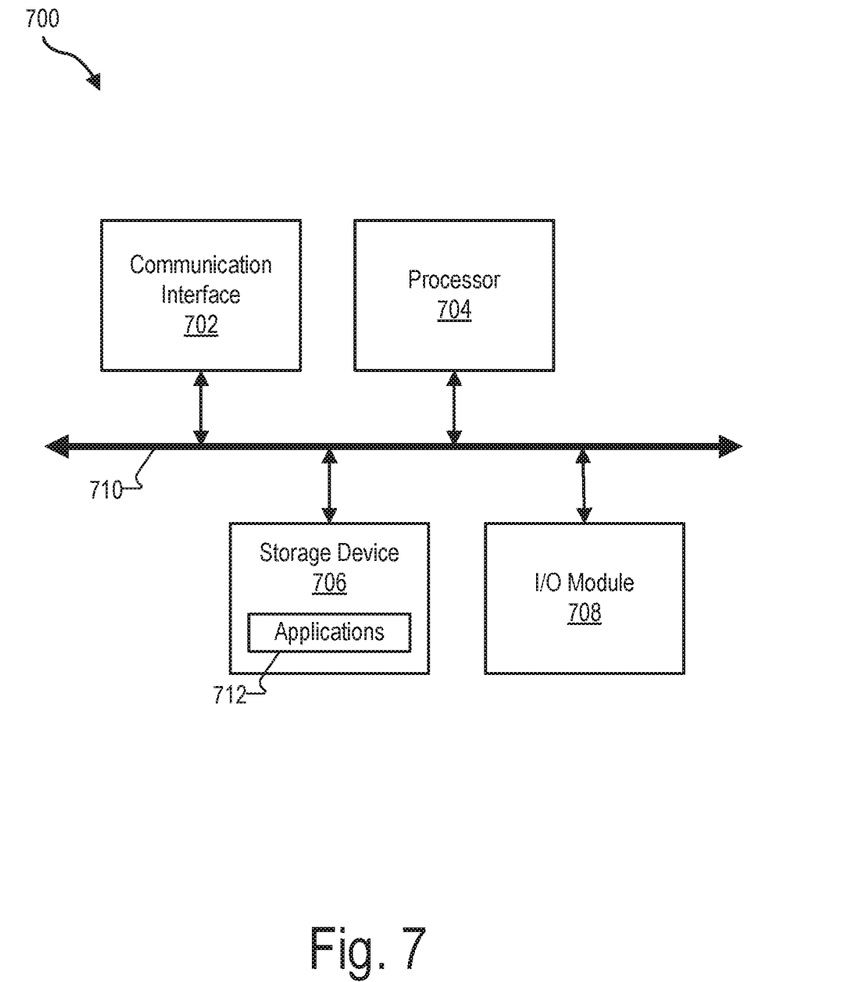
FIG. 7 illustrates an exemplary computing device according to principles described herein.

FIG. 7 illustrates an exemplary computing system 700 that may be specifically configured to perform one or more of the processes described herein. For example, computing system 700 may implement a media content transfer management system such as system 300, or any other computing systems or devices (e.g., DVR systems and/or DVR devices such as DVR device 102, source DVR device 404, target DVR device 406, etc.) described herein.

As shown in FIG. 7, computing system 700 may represent any computing system or device that includes components such as a communication interface 702, a processor 704, a storage device 706, and an input/output ("I/O") module 708 communicatively connected via a communication infrastructure 710. While an exemplary computing system 700 is shown in FIG. 7, the components illustrated in FIG. 7 are not intended to be limiting. Additional or alternative components may be used in other embodiments. Components of computing system 700 shown in FIG. 7 will now be described in additional detail.

Communication interface 702 may be configured to communicate with one or more computing systems and/or devices. Examples of communication interface 702 include, without limitation, a wired network interface (such as a network interface card), a wireless network interface (such as a wireless network interface card), a modem, an audio/video connection, and any other suitable interface.

Processor 704 generally represents any type or form of processing unit capable of processing data or interpreting, executing, and/or directing execution of one or more of the instructions, processes, and/or operations described herein. Processor 704 may direct execution of operations in accordance with one or more applications 712 or other computer-executable instructions such as may be stored in storage device 706 or another computer-readable medium.

Storage device 706 may include one or more data storage media, devices, or configurations and may employ any type, form, and combination of data storage media and/or device. For example, storage device 706 may include, but is not limited to, a hard drive, network drive, flash drive, magnetic disc, optical disc, RAM, dynamic RAM, other non-volatile and/or volatile data storage units, or a combination or sub-combination thereof. Electronic data, including data described herein, may be temporarily and/or permanently stored in storage device 706. For example, data representative of one or more executable applications 712 configured to direct processor 704 to perform any of the operations described herein may be stored within storage device 706. In some examples, data may be arranged in one or more databases residing within storage device 706.

I/O module 708 may include one or more I/O modules configured to receive user input and provide user output. One or more I/O modules may be used to receive input for a single virtual experience. I/O module 708 may include any hardware, firmware, software, or combination thereof supportive of input and output capabilities. For example, I/O module 708 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 708 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 708 is configured to provide graphical data to a display for presentation to a user. The graphical data may be representative of one or more graphical user interfaces and/or any other graphical content as may serve a particular implementation.

In some examples, any of the facilities described herein may be implemented by or within one or more components of computing system 700. For example, one or more applications 712 residing within storage device 706 may be configured to direct processor 704 to perform one or more processes or functions associated with communication facility 302 and/or media content transfer management facility 304 of system 300. Likewise, storage facility 306 of system 300 may be implemented by or within storage device 706.

To the extent the aforementioned embodiments collect, store, and/or employ personal information provided by individuals, it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A system comprising:
a source digital video recording ("DVR") device storing media content;
a target DVR device communicatively coupled to the source DVR device via a local connection; and
a remote media content transfer management system communicatively coupled to the source DVR device and the target DVR device via a remote network,
wherein the target DVR device is configured to:
receive a transfer request to transfer media content from the source DVR device to the target DVR device for storage on the target DVR device, and
transmit, in response to the transfer request and over the remote network, an initiation request to the remote media content transfer management system, the initiation request indicating a request to authorize the transfer of the media content from the source DVR device to the target DVR device;
wherein the remote media content transfer management system is configured to:
verify, in response to the initiation request, that the source and the target DVR devices are both associated with a same user account, and
transmit, over the remote network and based on the verifying, a command to the source DVR device, the command configured to put the source DVR device in a media content transfer mode;
wherein the source DVR device is configured to transmit, to the target DVR device over the local network while in the media content transfer mode, a discovery message; and
wherein the target DVR device is further configured to:
establish, based on the discovery message, a communication session with the source DVR device over the local connection, and
receive, through the communication session, the media content from the source DVR device.

2. The system of claim 1, wherein the remote media content transfer management system is further configured to transmit, to the target DVR device and in response to the initiation request, device information associated with the source DVR device.

3. The system of claim 2, wherein the device information includes at least one of:
a device name,
a unit address,
a serial number, and
a user account number.

4. The system of claim 2, wherein:
the discovery message includes device information associated with the source DVR device; and
the establishing, based on the discovery message, the communication session with the source DVR device includes comparing the device information in the discovery message with the device information received from the remote media content transfer management system.

5. The system of claim 1, wherein the local connection includes a direct connection between the source DVR device and the target DVR device.

6. The system of claim 5, wherein the direct connection is by way of a coaxial cable connecting the source DVR device and the target DVR device.

7. The system of claim 1, wherein the local connection includes a local area network (LAN).

8. The system of claim 7, wherein the discovery message is configured to be parsed by the target DVR device and not parsable by other devices on the LAN.

9. The system of claim 1, wherein the remote media content transfer management system is further configured to transmit, over the remote network and based on the verifying, a software update to the source DVR device to enable the media content transfer mode.

10. The system of claim 1, wherein the media content is transferred in an encrypted format.

11. The system of claim 1, wherein the remote media content transfer management system is further configured to verify the media content to allow for playback only on either the target DVR device or the source DVR device at any given time.

12. The system of claim 1, wherein the remote media content transfer management system is further configured to transmit, based on the receiving of the media content by the target DVR device, an instruction to the source DVR device to delete the media content.

13. The system of claim 1, wherein the target DVR device is further configured to:
receive, through the communication session, metadata associated with media content assets on the source DVR device;
provide, based on the metadata and to the user, a list of the media content assets; and
receive, from the user a selection of a subset of the media content assets, and
wherein the media content includes the subset of the media content assets.

14. A method comprising:
receiving, by a target digital video recording ("DVR") device, a transfer request for a source DVR device to transfer media content stored on the source DVR device to the target DVR device for storage on the target DVR device;
transmitting, by the target DVR device in response to the transfer request and over a remote network, an initiation request to a remote media content transfer management system, the initiation request indicating a request to authorize the transfer of the media content from the source DVR device to the target DVR device, the remote media content transfer management system configured to:
verify, in response to the initiation request, that the target and source DVR devices are both associated with a same user account, and
transmit, over the remote network and based on the verifying, a command to the source DVR device, the command configured to put the source DVR device in a media content transfer mode;
receiving, by the target DVR device from the source DVR device over a local connection and while the source DVR device is in the media content transfer mode, a discovery message;
establishing, by the target DVR device based on the discovery message, a communication session with the source DVR device over the local connection; and
receiving, by the target DVR device by way of the communication session, the media content from the source DVR device.

15. The method of claim 14, further comprising receiving, by the target DVR device from the remote media content transfer management system, in response to the initiation request, device information associated with the source DVR device.

16. The method of claim 15, wherein:
the discovery message includes device information associated with the source DVR device; and
the establishing, based on the discovery message, the communication session with the source DVR device includes comparing the device information in the discovery message with the device information received from the remote media content transfer management system.

17. The method of claim 14, further comprising:
receiving, by the target DVR device and through the communication session, metadata associated with media content assets on the source DVR device;
providing, by the target DVR device and based on the metadata, to the user, a list of the media content assets; and
receiving, by the target DVR device, from the user, a selection of a subset of the media content assets, and
wherein the media content includes the subset of the media content assets.

18. A system comprising:
a memory storing instructions;
a processor communicatively coupled to the memory and configured to execute the instructions to:
receive a transfer request for a source DVR device to transfer media content stored on the source DVR device;
transmit, in response to the transfer request and over a remote network, an initiation request to a remote media content transfer management system, the initiation request indicating a request to authorize the transfer of the media content from the source DVR device, the remote media content transfer management system configured to:
verify, in response to the initiation request, that the system and the source DVR devices are both associated with a same user account, and
transmit, over the remote network and based on the verifying, a command to the source DVR device, the command configured to put the source DVR device in a media content transfer mode;
receive, from the source DVR device over a local connection and while the source DVR device is in the media content transfer mode, a discovery message;
establish, based on the discovery message, a communication session with the source DVR device over the local connection; and
receive, by way of the communication session, the media content from the source DVR device.

19. The system of claim 18, wherein the processor is further configured to execute the instructions to receive, from the remote media content transfer management system, in response to the initiation request, device information associated with the source DVR device.

20. The system of claim 19, wherein:
the discovery message includes device information associated with the source DVR device; and
the establishing, based on the discovery message, the communication session with the source DVR device includes comparing the device information in the discovery message with the device information received from the remote media content transfer management system.

\* \* \* \* \*